United States Patent Office 3,428,103
Patented Feb. 18, 1969

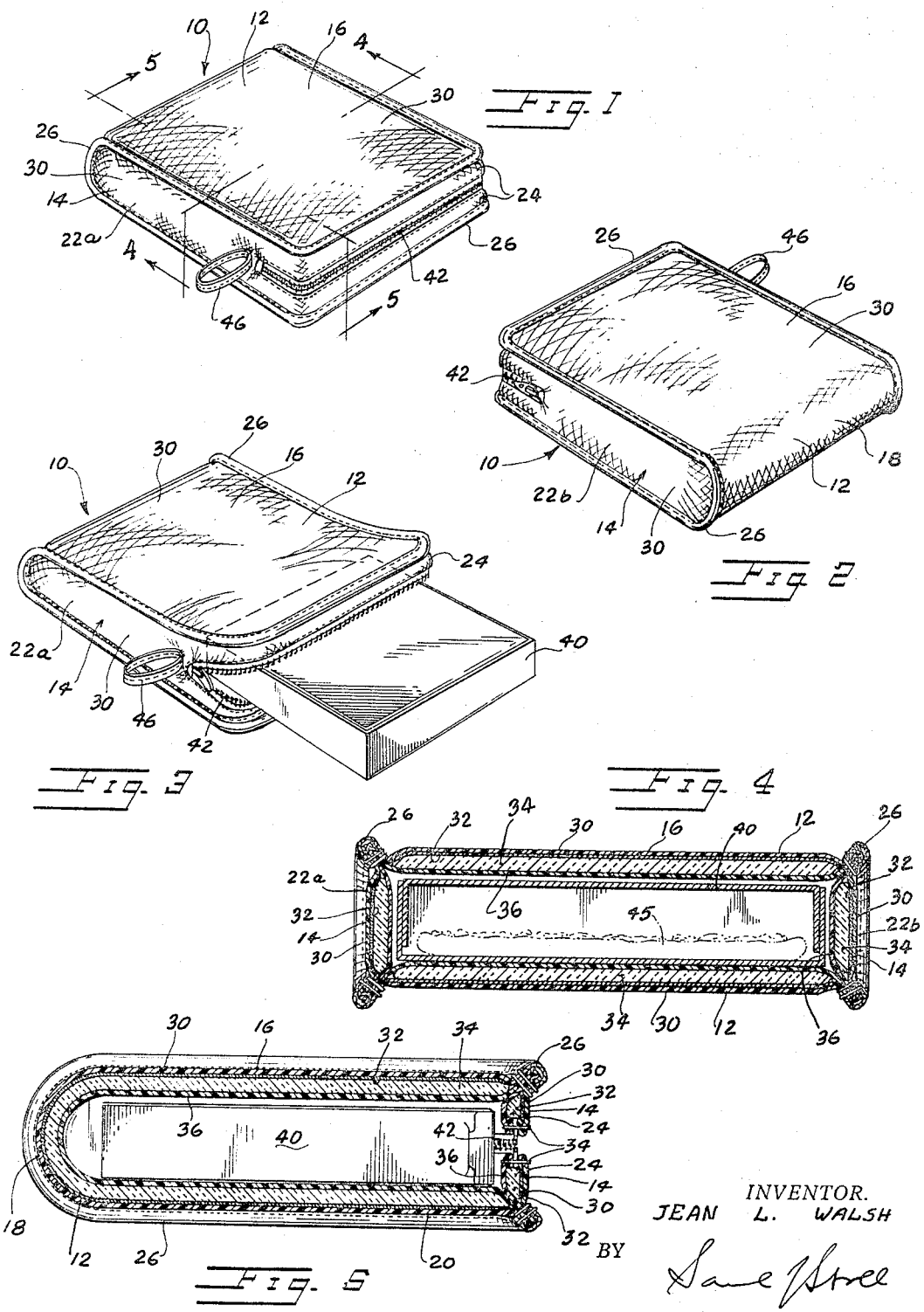

3,428,103
INSULATED CONTAINER FOR PIZZA PIES
Jean L. Walsh, 94–26 Van Wyck Expressway,
Richmond Hill, N.Y. 11418
Filed May 29, 1967, Ser. No. 643,802
U.S. Cl. 150—2.2           4 Claims
Int. Cl. B65d 5/56; A61f 7/00

ABSTRACT OF THE DISCLOSURE

A fully enclosed flexible insulated container having an end closure extending part way down each side, said container having a single continuous welted sewn seam, said container having a substantially rectangular interior in frontal cross-section, said container further having washable interior and exterior surfaces, and said container being insulated with thermal and reflective insulations so as to retain both conducting and radiating heat.

BACKGROUND OF THE INVENTION

Field of the invention

Insulated portable containers for protection during delivery of heated articles.

Description of the prior art

Prior hereto there was no known means for conveniently protecting against the escape from a heated article of both conductive and radiant heat so as to maintain over a suitable length of time a desired temperature level of that article.

Summary of the invention

The present invention provides a container into which a heated article may be placed and enclosed so as to maintain a desired temperature or range of temperatures of the article over a period of time during which the article may be moved or delivered from location to location.

Accordingly it is an object of the present invention to provide an insulated container for articles which is entirely and easily portable.

It is another object of the present invention to provide an insulated container which will protect its contents against rapid or undesirable changes in temperature. While the present invention is primarily intended for use with heated articles, it may also be used for cooled articles.

It is a further object of the present invention to provide an enclosure into which articles may be placed and which thermally insulates the enclosed article from outside environmental conditions.

It is a still further object of the present invention to provide an enclosure for articles which mechanically insulates and protects the enclosed articles from outside mechanical abuse and shock.

Basically, and not by way of limitation, the present invention provides a flexible multi-laminar wall which is sewn to a similarly constructed end by means of a single continuous welted sewn seam. The multi-laminar wall construction consists of an upper flexible washable protective exterior surface, a reflecting metal foil layer, a flexible relatively resiliant thermally insulating layer and an inner flexible washable protective layer.

Brief description of the drawing

In the drawing:
FIGURE 1 is a pictorial frontal view of the present invention showing the closure closed.
FIGURE 2 is a pictorial view of the rear of the present invention as shown in FIGURE 1.
FIGURE 3 is a pictorial frontal view of the present invention showing the closure opened and showing an article, partially in phantom, partially inserted therein.
FIGURE 4 is a cross-sectional view as taken across line 4—4 of FIGURE 1.
FIGURE 5 is a cross-sectional view as taken across line 5—5 of FIGURE 1.

Description of a preferred embodiment

Referring to the drawing, the insulated container 10 comprises two multi-laminar wall members 12 and 14. Wall 12 is the larger of the two and is so cut and formed as to become the top 16, rear 18 and bottom 20 surfaces of insulated container 10. Thus, top 16, rear 18 and bottom 20 are formed of one continuous unbroken insulated wall member 12.

Wall member 14 is cut and formed to provide sides 22a and 22b and front 24. Thus, side 22a, front 24 and side 22b are formed of one continuous wall member 14.

The joint between wall member 12 and wall member 14 is sealed by sewing the ends of said wall members together where they meet each other and by covering the sewn seam with a welt 26. As may be seen from the drawing, there is only one sewn seam and only one welt 26, each being continuous and endless.

The multi-laminar construction of wall members 12 and 14 are similar and comprise an outer surface layer 30, a second reflecting layer 32, a third insulating layer 34 and an inner layer 36.

Preferably, outer layer 30 and inner layer 36 should be flexible, waterproof, washable and durable. A suitable plastic material may be used.

Reflecting layer 32 is preferably of a thin flexible metal foil, such as aluminum foil, and serves to reflect radiant heat.

Third layer 34 is intended to provide both thermal and mechanical insulation and therefore is preferably of a material such as fiber glass or foam plastic and should be relatively soft, flexible and resilient and have good thermal insulating values.

An opening is provided in front 24 to permit insertion of an article 40 into insulated container 10. To permit the opening to be expanded to receive article 40, the opening extends part way into sides 22a and 22b. To permit sealing of article 40 within insulated container 10, the opening is provided with a suitable closure such as a zipper 42.

Article 40 may be anything which is to be protected thermally and mechanically from outside environment. Thus if article 40 is heated above the temperature of the outside environment, insulated container 10 will prevent both conductive and radiant heat from leaving article 40 and will at the same time protect article 40 from outside mechanical shock and abuse. If, however, article 40 is cooled to a temperature below that of the outside environment, insulated container 10 will prevent both conductive and radiant heat from entering article 40.

The present invention is primarily intended for use in delivering pizza pies which should be delivered virtually as hot as when baked. Accordingly insulated container 10 is shown to have a rectangular cross-section in frontal view, as may be seen in FIGURE 4, to accommodate the generally rectangular dimensions of the box which contains pizza pie 45.

A loop 46 may be provided to permit convenient hanging of insulated container 10 when not in use.

What is claimed is:
1. An insulated container for articles comprising:
   a first multi-laminar insulating wall,
   a second multi-laminar insulating wall,
   an opening formed in said second multi-laminar wall and a closure member associated therewith, said first multi-laminar wall and said second multi- laminar wall being joined together to form an enclosure into which articles may be placed through said opening, the multi-laminar construction of said first multi-laminar wall and said second multi-laminar wall comprising:
- an outer layer, said outer layer being flexible and washable,
- a second layer, said second layer being flexible and radiant heat reflecting,
- a third layer, said third layer being thermally and mechanically insulating, and
- an inner layer, said inner layer being flexible and washable.

2. An insulated container in accordance with claim 1, wherein said second layer is aluminum foil.

3. An insulated container in accordance with claim 2, wherein said third layer is fiber glass.

4. An insulated container in accordance with claim 2, wherein said third layer is foam plastic.

References Cited

UNITED STATES PATENTS

| | | | |
|---|---|---|---|
| 1,755,548 | 4/1930 | Lowe | 190—43 |
| 2,563,933 | 8/1951 | Hipps | 150—2.1 X |
| 2,575,893 | 11/1951 | Seaman | 150—2.1 |
| 2,623,566 | 12/1952 | Kibler | 150—28 |
| 2,661,785 | 12/1953 | Daust | 150—2.1 X |

FOREIGN PATENTS 754,637    8/1956    Great Britain.

DONALD F. NORTON, *Primary Examiner.*